United States Patent
Megretski et al.

(10) Patent No.: US 11,149,156 B2
(45) Date of Patent: Oct. 19, 2021

(54) PHOTOPOLYMER BLENDS AND RELATED METHODS

(71) Applicant: Formlabs, Inc., Somerville, MA (US)

(72) Inventors: Dmitri Megretski, Carlisle, MA (US); Maximilian Zieringer, Cambridge, MA (US); Benjamin FrantzDale, Harvard, MA (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 15/962,219

(22) Filed: Apr. 25, 2018

(65) Prior Publication Data

US 2018/0312705 A1    Nov. 1, 2018

Related U.S. Application Data

(60) Provisional application No. 62/490,096, filed on Apr. 26, 2017.

(51) Int. Cl.
| | | |
|---|---|---|
| *C09D 11/101* | (2014.01) | |
| *C09D 11/037* | (2014.01) | |
| *B33Y 70/00* | (2020.01) | |
| *C08K 5/00* | (2006.01) | |
| *C08K 3/013* | (2018.01) | |

(52) U.S. Cl.
CPC ............ *C09D 11/101* (2013.01); *B33Y 70/00* (2014.12); *C09D 11/037* (2013.01); *C08K 3/013* (2018.01); *C08K 5/0041* (2013.01)

(58) Field of Classification Search
CPC ..... C09D 11/101; C09D 11/037; B33Y 70/00; C08K 5/004; C08K 3/013
See application file for complete search history.

(56) References Cited

U.S. PATENT DOCUMENTS

| | | |
|---|---|---|
| 6,133,336 A | 10/2000 | Popat et al. |
| 2015/0314039 A1 | 11/2015 | Dean et al. |
| 2016/0068696 A1 | 3/2016 | Xu |
| 2016/0244628 A1 | 8/2016 | Breton et al. |

FOREIGN PATENT DOCUMENTS

| | | |
|---|---|---|
| WO | WO 2016/176444 A1 | 11/2016 |
| WO | WO 2017/064145 A1 | 4/2017 |

OTHER PUBLICATIONS

International Search Report and Written Opinion for International Application No. PCT/US2018/29300 dated Jul. 19, 2018.
Extended European Search Report dated Dec. 18, 2020 in connection with European Application No. 18790869.4.
International Preliminary Report on Patentability dated Nov. 7, 2019 in connection with International Application No. PCT/US2018/029300.
EP 18790869.4, Dec. 18, 2020, Extended European Search Report.
PCT/US2018/029300, Nov. 7, 2019, International Preliminary Report on Patentability.

*Primary Examiner* — Jessica M Roswell
(74) *Attorney, Agent, or Firm* — Wolf, Greenfield & Sacks, P.C.

(57) ABSTRACT

The present application relates generally to photopolymer blends and related methods for use in an additive fabrication (e.g., 3-dimensional printing) device. According to some aspects, compositions are provided for the modification of a base photopolymer resin. The compositions may comprise colorant agent and/or cure-modifying composition. The compositions may be selected to cause, when combined with the base photopolymer resin to form a photo-curable composition, at least one property (e.g., color, depth of the cure) of the photo-curable composition to fall within a predetermined range. Related kits and methods are also generally described.

16 Claims, 2 Drawing Sheets

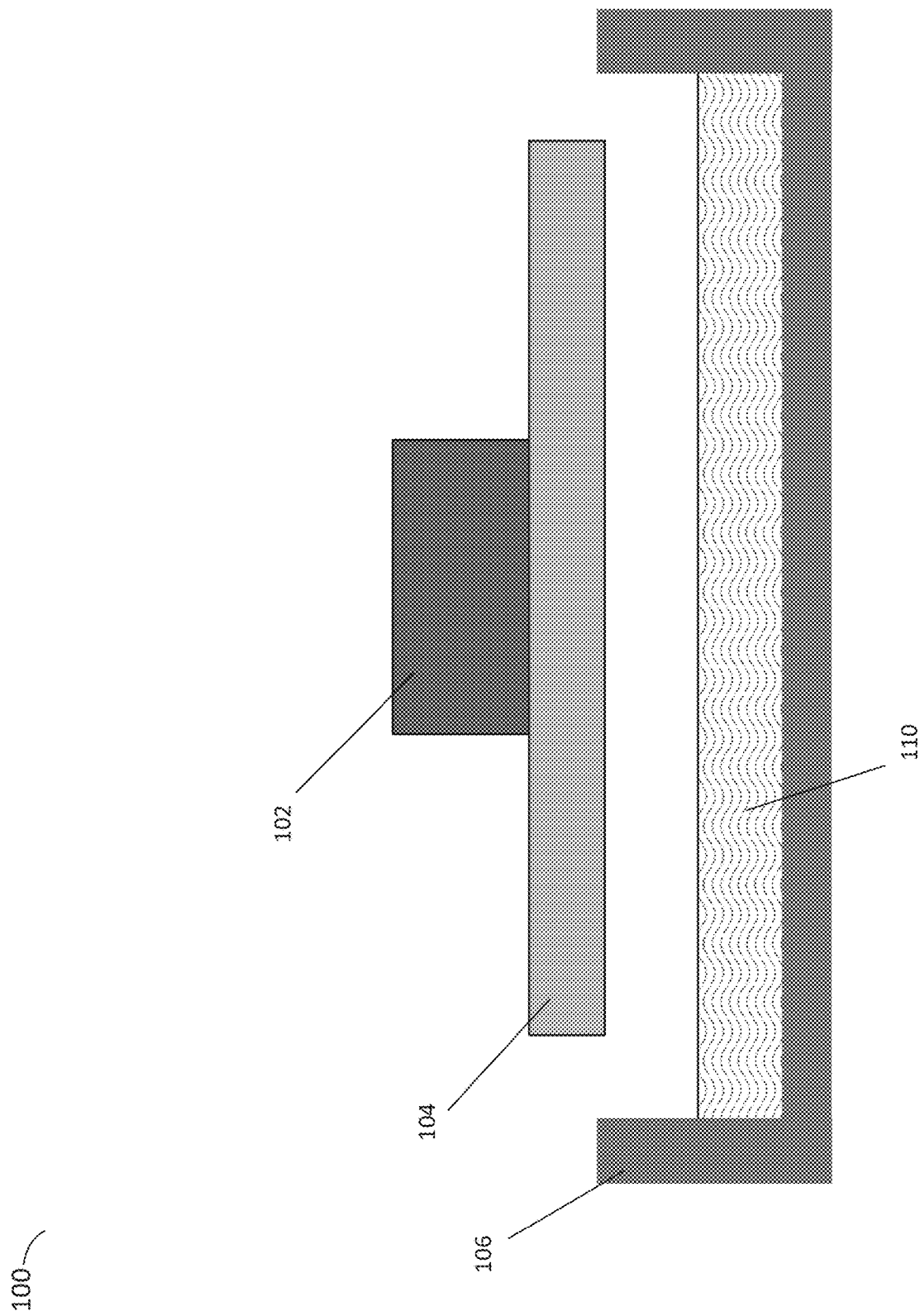

PHOTOPOLYMER BLENDS AND RELATED METHODS

CROSS-REFERENCE TO RELATED APPLICATIONS

The present application claims the benefit under 35 U.S.C. § 119(e) of U.S. Provisional Application No. 62/490,096, titled "Photopolymer Blends and Related Methods," filed Apr. 26, 2017, which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a build platform and then one on top of another. Exposure to actinic radiation cures a thin layer of liquid resin, which causes it to harden and adhere to previously cured layers or to the bottom surface of the build platform.

SUMMARY

The present application relates generally to photopolymer blends and related methods for use in an additive fabrication (e.g., 3-dimensional printing) device.

According to one or more embodiments, a composition for the modification of a base photopolymer resin is provided. The composition may comprise at least one colorant agent. The compositions may comprise at least one cure-modifying composition. The at least one colorant agent and/or at least one cure-modifying composition may be selected to cause, when combined with the base photopolymer resin to form a photo-curable composition, at least one property of the photo-curable composition to fall within a pre-determined range.

According to one or more embodiments, a kit of components for producing photo-curable compositions for additively-manufacturing an article is provided. The kit may comprise a base resin component. The kit may comprise one or more colorant components. Each of the colorant component may comprise a colorant agent. When one or more colorant components are combined with the base resin component, a photo-curable composition may be produced for additively manufacturing an article having a designated color.

According to one or more embodiments, a method of producing a photo-curable composition is provided. The method may comprise combining a base resin component with one or more colorant components at a point of use at a ratio to produce a photo-curable composition for additively manufacturing an article having a designated color.

According to one or more embodiments, a kit of components for producing a photo-curable composition for additively-manufacturing an article is provided. The kit may comprise a base resin component. The kit may comprise a cure-modifying component. The cure-modifying component may comprise at least one of a photoinitiator species or a blocker species. When the cure-modifying component is combined with the base resin component, a photo-curable composition may be produced for additively-manufacturing an article having a designated depth of cure for a given actinic radiation.

According to one or more embodiments, a method of producing a photo-curable composition is provided. The method may comprise combining a base resin component with a cure-modifying component as a point of use at a ratio to produce a photo-curable composition having a designated depth of cure for a given actinic radiation. The cure-modifying component may comprise at least one of a photoinitiator species or a blocker species.

The foregoing is a non-limiting summary of the invention, which is defined by the attached claims.

BRIEF DESCRIPTION OF DRAWINGS

Various aspects and embodiments will be described with reference to the following FIGURES. It should be appreciated that the figures are not necessarily drawn to scale. In the drawings, each identical or nearly identical component that is illustrated in various FIGURES is represented by a like numeral. For purposes of clarity, not every component may be labeled in every drawing.

FIGS. 1A-1B depict an illustrative additive fabrication system, according to some embodiments.

DETAILED DESCRIPTION

Figure 1B:
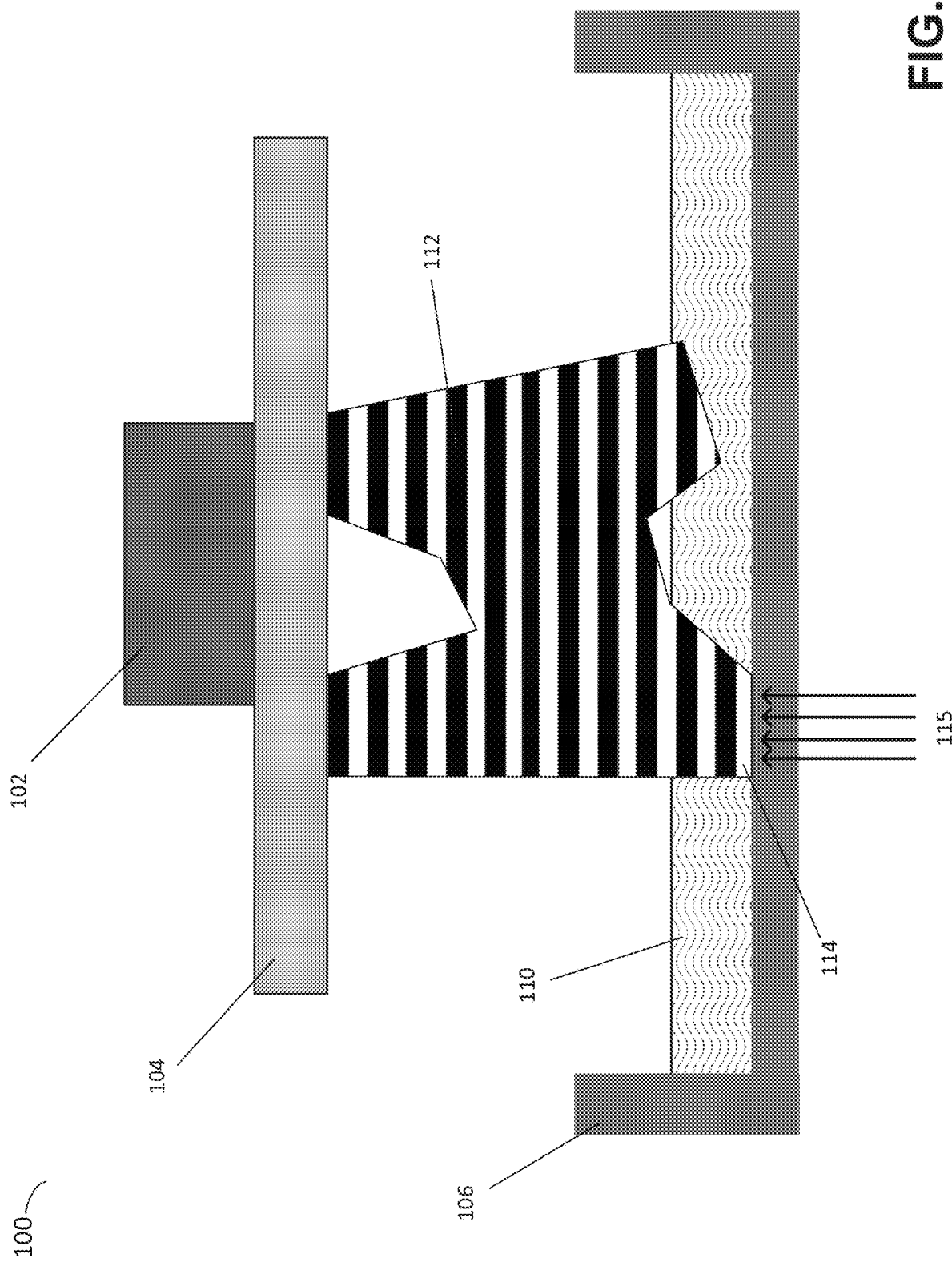

As discussed above, some additive fabrication techniques form solid objects by solidifying (also referred to herein as "curing") a liquid, such as a photopolymer resin. Photopolymer resins may be comprised of monomer and/or oligomer subunits of polymer, reactive diluents, flexibilizers, stabilizers, photoinitiators of polymerization, light-blocking compounds (blockers), and various types of additional colorant agents, such as dyes, pigments, or suspended materials. The particular formula and ratio of such constituents may significantly affect the characteristics of the photopolymer resin, including the "depth of penetration," typically designated as $D_P$ and the energy of cure, typically designated as $E_C$. Broadly, in a simplified model of photopolymerization commonly used in the art, polymerization in a region of photopolymer is initiated once a dose of actinic radiation is received greater than $E_C$, which reflects a critical level of exposure to begin the polymerization reaction by the activation or other interaction of actinic radiation with the photoinitiator(s) in the photopolymer resin. Actinic radiation incident onto a surface of the photopolymer resin, such as a laser beam, may also penetrate a certain distance beyond that surface into a volume of photopolymer resin. Conventionally, the distance of such penetration is designated as $D_P$, which reflects the depth at which the intensity of a laser beam, or other focused actinic radiation source, decreases to 1/e (or about 36.8%) of the intensity incident at the surface of the photopolymer resin. The combination of $E_C$ and $D_P$, together with the amount of incident actinic radiation, then significantly controls the thickness of photopolymer that is polymerized in a given exposure, sometimes known as the depth of cure, designated as $D_C$. Such depth of cure is itself closely associated with the range of possible layer heights and other part quality issues.

Adjustments may be made to the composition of photopolymer resin to achieve greater or lesser values for $E_C$ and/or $D_P$, thus altering the depth of cure. As one example, photopolymer resin typically includes one or more compounds, known as photoinitiators, which react to actinic radiation by initiating the photopolymerization of polymer subunits within the resin. Within certain constraints, increased concentrations of photoinitiators may decrease the amount of actinic radiation needed to initiate polymerization, i.e., lower the $E_C$ of the resin. The increase in concentration of photoinitiator, and consequently lowered $E_C$, may result in the initiation of polymerization at greater distances from the incident surface of the photopolymer resin, thus increasing the depth of cure. As another example, photopolymer resin typically includes one or more compounds known as light blockers or blockers, which are additives whose primary role is to absorb or otherwise dissipate a portion of actinic radiation. Within certain constraints, increased concentrations of blockers may decrease the degree to which actinic radiation may penetrate beyond the incident surface of the photopolymer resin, thus decreasing the $D_P$ of the photopolymer resin. The increase in concentration of light blocker may further result in an increase to $E_C$, as energy that would otherwise contribute to the initiation of polymerization is absorbed or otherwise dissipated by the light blocking compounds.

Various challenges may be encountered when attempting to control properties related to depth of cure. One such challenge is the creation of photopolymer resins with superficially similar gross properties (e.g., depth of cure), but with different cosmetic appearances (e.g., color or opaqueness). As an example, it is often desirable to formulate different colored photopolymer resins by adding particular colorant agents to a photopolymer resin. The interaction of the colorant agents, however, tends to result in varying values of $E_C$ and $D_P$ depending on the specific color. In particular, colorant agents (such as pigments, dyes), opaquing agents, and other similar compounds, may interact with actinic radiation so as to modify the $E_C$ and/or $D_P$, and thus depth of cure, of photopolymer resin. Such complications created when formulating different colors generally require additional adjustment of settings and/or calibration of the actinic radiation used in connection with the specific color photopolymer composition to attempt to conform to target $E_C$ and $D_P$ values, significantly increasing the cost and difficulty of preparing and using photopolymer resins with varying cosmetic properties.

Another challenge related to depth of cure concerns the ability to vary the depth of cure of a resin. In some circumstances, it may be desirable to use a photopolymer resin having a customized depth of cure for a specific building application. A user may, for example, wish to have a depth of cure that matches the layer height used during the build. The layer height refers to the height of each successive layer formed during some types of manufacturing processes, as described further in regard to FIGS. 1A and 1B below. Some printers are designed to allow users to choose between a range of layer heights, for example from 25 micron through 100 micron. The depth of cure for the resin, however, is generally fixed for a given incident radiation energy and for a given resin formulation. A resin used in conjunction with the example printer will generally be formulated to have a depth of cure of at least the thickest layer height (100 micron, in this example), which decreases the accuracy possible in builds where a user would prefer a finer layer height (e.g., 25 micron). For surfaces facing the actinic radiation, using a resin with a preset 100 micron depth of cure may be acceptable, even when building 25 micron layers, because the excess penetration of radiation will be into previously cured resin and so not distort geometry, however, the excess curing is not ideal. For surfaces facing away from the radiation, however, nothing will typically prevent the actinic radiation from continuing to penetrate the full depth of cure and thus form an actual surface about 75 micron away from the desired point (in this example)

In view of the above-described problems and challenges, the inventors have recognized and appreciated arrangements of components and improved additive fabrication processes that mitigate one or more of these problems. For example, the inventors have recognized and appreciated that, in some embodiments, the colorant components and/or cure-modifying components may be provided separately from a base resin component (e.g., as part of a kit). The components may be formulated to allow for a broad range of resin colors to be produced upon combination of the components at a point of use, thus not requiring individual calibration of the 3D printer, and/or the verification of the printer settings for every color. Furthermore, in some embodiments, each of the separate colorant components are formulated such that when mixed with the base photopolymer resin, the blended photocurable resin will have the same depth of cure regardless of the ratios at which the colorant components are added.

As another example, the inventors have recognized and appreciated that, in some embodiments, the arrangements of components and related methods may allow for the production of photo-curable resins having a broad range of depth of cure, without requiring separate manufacture of the resins and without requiring individual calibration or adjustment of the manufacturing device (e.g., 3D printer). Such a result may be achieved, for example, by providing a cure-modifying component separate from a base resin component. The cure-modifying component may comprise photoinitiator and/or blocker species. The cure-modifying component may be blended with the base resin by, for example, a user at a point to use, to provide a blended photopolymer having a desired depth of cure. Furthermore, in some embodiments, a blended photopolymer resin may be customized (for example, customized by an end user) to have both a desired color and a desired depth of cure.

The compositions, kits, and methods disclosed herein allow for blended photocurable resins to be formulated and distributed in a more efficient way to users. For example, by providing colorant composition(s) and/or cure-modifying composition(s) separate from a base photopolymer resin, the disclosed compositions and methods avoid problems associated with distributing different colorant agents or cure-modifying compositions already mixed with base photopolymer resin. The presently disclosed invention provides for improvements over alternate configurations, for example, configurations in which a set of colored photopolymer resins (e.g., a CMYK color set) are distributed as a pre-mixed combination comprising colorant agent and base resin. Such compositions are prone to spoilage or waste, as relatively large ratios of photocurable resin, are required in each of the colorant bottles, as compared to the amount of colorant agent and other additives included.

Embodiments in which colorant agents, and/or cure-modifying compositions are stored as separate components from a base resin stock allow for a more efficient distribution of separate components and reduce potential drawbacks related to waste, spoilage or inefficient storage, and allow for simplified customization of a resin having desired properties, along with providing other advantages. Other separate additive components may also be provided to allow for customization of a blended photopolymer resin.

According to certain embodiments, a composition for the modification of a base photopolymer resin comprises at least one colorant agent and/or at least one cure-modifying composition. The at least one colorant agent and/or at least one cure-modifying composition may be selected to cause, when combined with the base photopolymer resin to form a photo-curable composition, at least one property of the photo-curable composition to fall within a pre-determined range. The property of the blended photo-curable composition may be the depth of cure and/or the color. Other properties may also be controlled, in a similar manner.

According to some embodiments, separate components for producing photo-curable compositions for additively-manufacturing an article constitute a kit. The kit may comprise a base resin component. The kit may further comprise one or more colorant components. The components of the kit may be maintained in separate storage containers until combined. When one or more colorant components are combined with the base resin component, a photo-curable composition may be produced for additively-manufacturing an article having a designated color.

As used herein, a kit refers to a collection of components that are physically separated (e.g., stored in separate containers) but that may be combined to form a composition, and are intended for use in conjunction with one another. The components of the kit may be sold together or may be sold individually. For example, in some embodiments, a kit constitutes the packaging of all the components for sale together. In some embodiments, a kit constitutes a set of components that were obtained separately, but are intended to be combined to form a composition.

In some embodiments, the base resin component and the one or more colorant components are capable of being variously combined at different ratios to form a plurality of photo-curable compositions, wherein each of the plurality of photo-curable compositions has a substantially consistent depth of cure for a given actinic radiation independent of the ratios in which the one or more colorant components are combined with the base resin component. For example, the base resin and one or more colorant components may be mixed at a ratio to form a photo-curable composition that produces a light yellow article, or the components may be mixed in different ratios to form a resin that produces a dark blue article. In either case, however, the resin has the same depth of cure at a given actinic radiation. This uniformity in depth of cure may be provided by formulating each of the different colorant components to result in the same depth of cure. The amount of a cure-modifying compound (e.g., photoinitiator or blocker) may be calibrated in each colorant component to offset the effects of the colorant agent in the component on the depth of cure. In such embodiments, sufficient cure-modifying compounds are provided so that the resulting photo-curable composition has a known target set of designated resin properties, including a specific $E_C/D_P$ within a desired range. For example, a colorant component having a colorant agent with significant absorption of the actinic radiation, would accordingly include less light-blocking compound in order to reach the targeted level of $E_C/D_P$ in the resulting photo-curable composition.

In some embodiments, the kit may include a set of four colorant component, one for each color of the standard CMYK model (i.e., cyan, magenta, yellow, and key (black)). In some embodiments, the kit may comprise a base resin component at a relatively large quantity, and four colorant components (one for each of the CMYK model) in relatively smaller amounts for mixing with the base resin component. A user would then mix the colorants, manually or through an automated process, with the base resin component at ratios that produce a designated color. Alternatively, a colorant component might include colorant agents for an arbitrary color. Any suitable type of colorant agent may be used. For example, the colorant agent may comprise a dye, a pigment, and/or a suspended material.

In embodiments where the colorant components include a cure-modifying composition, the cure-modifying composition (e.g., photoinitiator species and/or blocker species) may be formulated to counterbalance the effect of the colorant agent on the depth of cure. Such a formulation may allow for a desired consistent depth of cure across a range of different combinations of colorant component(s) and base resin component In some embodiments, the base resin component is substantially free of a colorant agent. Likewise, the colorant component and/or cure-modifying component may be substantially free of photopolymer resin.

In some embodiments, the base resin component is substantially free of a cure-modifying composition. In such embodiments, photoinitiators and/or blocking agents are supplied by a separate cure-modifying component. Alternatively, in some embodiments, the base resin component may comprise a baseline amount of cure-modifying composition (e.g., photoinitiator and/or blockers) that is supplemented by other components (colorant components and/or cure-modifying components).

In some embodiments, the base resin component and each of the one or more colorant components and/or cure modifying components are stored separately until combined at a point of use to produce the photo-curable composition. A point of use will typically be in the vicinity of the 3d-printer or other manufacturing device in which the photo-curable compound will be used to additively manufacture an article.

The kits and components described above may be incorporated into methods for producing photo-curable compositions. For example, in some embodiments, a base resin component is combined with one or more colorant components at a point of use at a ratio to produce a photo-curable composition for additively manufacturing an article having a designated color. The specific ratios at which different colorant components are to be combined to produce a designated color may be determined through, for example, a computer program/lookup table.

As discussed above, the base resin component may be substantially free of a colorant agent and/or a cure-modifying composition. In some embodiments, the colorant components may contain, in addition to colorant agents, a cure-modifying composition. The amount of cure-modifying composition (e.g., photoinitiators and/or blockers) may be calibrated to offset the effects of the colorant agents on the depth of cure of the resin. In some embodiments, each of the one or more colorant components has a formulation configured to produce a photo-curable composition having a substantially consistent depth of cure for a given actinic radiation, independent of the ratios in which the one or more colorant components are combined with the base resin component.

Methods of use may further comprise forming successive photo-cured layers of the photo-curable composition to produce the additively-manufactured article. An example, of such a process is discussed in conjunction with FIG. 1, below.

According to some embodiments, a kit of components may include a separate cure-modifying component. The cure-modifying component may comprise at least one of a photoinitiator species or a blocker species. The cure-modifying component may be combined with the base resin component to alter the depth of cure of the resulting composition. In some embodiments, a kit of components may comprise the base resin component and the cure-modifying component (e.g., without additional colorant components). In some embodiments the base resin component is substantially free of colorant agents, photoinitiators, and/or blocker species. In some embodiment, the base resin component comprises a baseline amount of cure-modifying compositions (e.g., photoinitiators and blockers), which are supplemented by mixing with the separate cure-modifying component.

In some embodiments, a kit of components may comprise the base resin component, the cure-modifying component, and one or more additional colorant components. The colorant components of such embodiments may each be pre-calibrated with cure-modifying compositions, as described above, so that they do not alter the depth of cure when mixed with the base resin component. Alternatively, in some embodiments comprising separate cure-modifying and colorant components, the colorant components are not pre-calibrated in this manner.

The kits and components described above may be incorporated into methods for producing photo-curable compositions. The cure-modifying component may be combined with the base-modifying component at a ratio to produce a designated depth of cure for a given actinic radiation. The cure-modifying component may be combined with the base-modifying component and one or more colorant components at ratios to produce a designated depth of cure and a designated color. The act of combining may be performed at a point of use (e.g., in the vicinity of the of the manufacturing device to be used).

The ratio for combination may be determined by any suitable manner. For example the ratios may be based on a predetermined formula, or the output of a software function based on known calibration tables. The user, either manually or through an automated process, may then add the colorant and/or cure-modifying components in the determined ratio to the base resin to produce the designated color and/or depth of cure.

In some embodiments, the inventors have found that the value of $D_P$ for a given resin may be determined by a function of the molecular extinction coefficients of the colorants added to the base resin as well as the scattering coefficients. Scattering coefficients include the cross-section of scattering, the anisotropy of scattering, and the cross section of absorption. This scattering affects both the $D_P$ as well as the $E_C$. Scattering may also alter the functional cross-section of the actinic radiation source. In particular, a generalized form of the Beer-Lambert law may be used to derive the following relationships between $D_P$ and C, M, Y, K colorants added to a base resin, where $\varepsilon_{base}$ and $c_{base}$ represent the molar attenuation coefficient and amount concentration, respectively, of the base resin, and $\varepsilon_C$, $\varepsilon_M$, $\varepsilon_Y$, $\varepsilon_K$ and $c_C$, $c_M$, $c_Y$, $c_K$ represent the molar attenuation coefficient and amount concentrations of C, M, Y, and K colorants, respectively:

$$A_{CMYK} = \varepsilon_{base}\, D_p\, c_{base} + \varepsilon_C\, D_p\, c_C + \varepsilon_M\, D_p\, c_M + \varepsilon_Y\, D_p\, c_Y + \varepsilon_K\, D_p\, c_K = -\log_{10}\left(\frac{1}{e}\right) = 0.43429$$

$$D_p = \frac{-\log_{10}\left(\frac{1}{e}\right)}{(\varepsilon_{base}c_{base} + \varepsilon_C c_C + \varepsilon_M c_M + \varepsilon_Y c_Y + \varepsilon_K c_K)}$$

As may be appreciated by those having skill in the art, values for attenuation coefficients for base resin and colorants may be based upon observed or known values, such as may be determined empirically by assay or by reference to relevant material datasheet. Similar values for amount concentrations may be determined based upon measured introductions of material. While the inventors have found that such a model is sufficiently predictive to allow for good results, other more or less detailed models approximating the physical interactions are also within the scope of the invention. In particular, the above model may be less effective when the concentration of colorants increases beyond 0.01 mol/L, when any of the colorants fluoresce, and/or when colorants have scattering cross-sections large enough to scatter actinic radiation or render the mixture non-homogenous.

In other embodiments, analytical models may not be used, or may only partially be used, in favor of curve fitting the function $D_p(c_C, c_M, c_Y, c_K)$ against a dataset of known concentrations and measured penetration depths. Such an empirical model may be particularly advantageous when additional interactions between components, such as fluorescence are anticipated, or when modelling the impact of an additional blocking compound, Z, as the function $D_p(c_C, c_M, c_Y, c_K, c_Z)$.

Methods of use may further comprise forming successive photo-cured layers of the photo-curable composition to produce the additively-manufactured article. An example, of such a process is discussed in conjunction with FIG. 1, below.

Other additives may be included in a kit, either as part of the colorant and/or cure-modifying components, or as part of a separate additive component. One example of an additional additive would be an opaquing agent, such as titanium dioxide, which provides a white opaque base for colors, removing transparency from the base resin. Other potential additive compounds include plasticizers, flexibilizers, or other types of compounds commonly added to photopolymer resin.

In the examples above, the user is generally adding the extra materials and mixing into the formulation. It would be possible to have the machine do so automatically, using various techniques for adding doses of calibrated amounts and mixing viscous materials, as would be understood by a person of ordinary skill in the art.

The blended photopolymer resin may then be used in an additive manufacturing process to produce an article. A non-limiting illustrative additive fabrication system is depicted in FIGS. 1A-1B. Illustrative stereolithographic printer 100 forms an article in a downward facing direction on a build platform such that layers of the part are formed in contact with a surface of a container in addition to a previously cured layer or the build platform. In the example of FIGS. 1A-1B, stereolithographic printer 100 comprises build platform 104, container 106 and liquid resin 110. A downward facing build platform 104 opposes the floor of container 106, which contains a photopolymer resin 110.

FIG. 1A represents a configuration of stereolithographic printer 100 prior to formation of any layers of an object on build platform 104. The photopolymer resin 110 may be generated through forming a blended photopolymer resin, as discussed throughout this disclosure.

As shown in FIG. 1B, an article 112 may be formed layerwise, with the initial layer attached to the build platform 104. In FIG. 1B, the layers of the part 112 are each formed from the same material but are shown in alternating colors merely to visually distinguish them in this example. The container's base surface may be transparent to actinic radiation, such that radiation can be targeted at portions of the thin layer of liquid photocurable resin resting on the base surface of the container. Exposure to actinic radiation 115 cures a thin layer of the liquid resin, which causes it to harden. The layer 114 is at least partially in contact with both a previously formed layer and the surface of the container 106 when it is formed. The top side of the cured resin layer typically bonds to either the bottom surface of the build platform 104 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

The preceding embodiments have focused on the utility of modifying the properties of the photopolymer resin by the introduction of various additives in order to optimize the behavior of the photopolymer resin when used in a curing process wherein the parameters of the curing process are treated as constants and only the properties of the photopolymer resin are varied. In many instances, however, this may be neither required nor desired. In some embodiments, the base photopolymer resin may be modified by combination or introduction of materials from kits, such as described as above, and the amounts and/or natures of the additives used to modify the process parameters, such as exposure energy, exposure speed, and spacing of exposure paths, to compensate for the specific choice of base resin and additives. It is well known in the art that the energy of cure $E_c$, depth of penetration $D_p$, depth of cure $C_d$, and energy introduced into the system $E_{max}$ may be approximately modelled by the following equation:

$$C_d = D_p \ln\left(\frac{E_{max}}{E_c}\right).$$

Using the techniques described above, then, $D_p$ and $E_c$ may be determined based upon the known amount of colorants and other additives introduced to a base photopolymer resin in order to determine the necessary amount of energy, $E_{max}$, required to be introduced to a given location in order to produce the desired depth of cure, $C_d$, which is typically some multiple of the desired layer height. The photopolymer resin may then be exposed to the desired $E_{max}$ in various ways known in the art and suitable for the type of actinic radiation source, such as laser scanning or mask projection. Further, in some embodiments, it may be advantageous to utilize the techniques of the invention to modify both the properties of the photopolymer resin by the introduction of known quantities of additives and to modify the process parameters simultaneously, in order to expand the range of possible amounts and types of additives or cure depths.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A kit of components for producing photo-curable compositions for additively-manufacturing an article, the kit comprising:
    a base resin component; and
    a plurality of colorant components separate from the base resin component, each colorant component comprising a colorant agent,
    wherein, when the plurality of colorant components are combined with the base resin component, a photo-curable composition is produced for additively-manufacturing an article having a color, wherein the photo-curable composition has the same depth of cure for a given actinic radiation irrespective of a relative ratio of the plurality of colorant components combined to produce the color.

2. The kit of claim 1, wherein each colorant agent of the plurality of colorant components comprises at least one of a dye, a pigment, or a suspended material.

3. The kit of claim 2, wherein each of the plurality of colorant components further comprises a cure-modifying composition.

4. The kit of claim 3, wherein each of the cure-modifying compositions of the plurality of colorant components comprises at least one of a photoinitiator species or a blocker species.

5. The kit of claim 4, wherein each of the cure-modifying compositions of the plurality of colorant components is formulated to counterbalance the effect of the colorant agent on the depth of cure.

6. The kit of claim 1, wherein the base resin component is free of a colorant agent.

7. The kit of claim 1, wherein the base resin component and each of the plurality of colorant components are stored separately until combined at a point of use to produce the photo-curable composition.

8. The kit of claim 1, wherein the plurality of colorant components comprise a cyan colorant component, a magenta colorant component, a yellow colorant component, and a black colorant component.

9. A kit of components for producing a photo-curable composition for additively-manufacturing an article, the kit comprising:
 a base resin component;
 a plurality of colorant components; and
 a cure-modifying component separate from the base resin component, the cure-modifying component comprising at least one of a photoinitiator species or a blocker species,
 wherein when the plurality of colorant components and the cure-modifying component are combined with the base resin component, a photo-curable composition is produced for additively-manufacturing an article, wherein the photo-curable composition has the same depth of cure for a given actinic radiation irrespective of a relative ratio of the plurality of colorant components combined to produce the photo-curable composition.

10. The kit of claim 9, wherein the photo-curable composition has the same depth of cure irrespective of a color of the photo-curable composition.

11. The kit of claim 9, wherein the base resin component is free of a colorant agent.

12. The kit of claim 9, wherein the cure-modifying component is free of a colorant agent.

13. The kit of claim 9, wherein each of the plurality of colorant components is free of a photoinitiator species or a blocker species.

14. The kit of claim 9, wherein the base resin component, the cure-modifying component, and each of the plurality of colorant components are stored separately until combined to produce the photo-curable composition.

15. The kit of claim 1, wherein the plurality of colorant components are formulated such that a plurality of different resin colors may be produced upon combination of the plurality of colorant components at a point of use, without individual calibration of an additive fabrication system and/or without the verification of the additive fabrication system settings for each desired color.

16. The kit of claim 1, wherein the plurality of colorant components are formulated such that photo-curable resins having the same depth of cure are produced, without requiring separate manufacture of the resins and/or without requiring individual calibration or adjustment of a manufacturing device.

* * * * *